United States Patent
Franco et al.

(10) Patent No.: US 11,624,036 B2
(45) Date of Patent: Apr. 11, 2023

(54) SAWDUST CHARCOAL

(71) Applicants: Riki Franco, New York, NY (US); Oron Franco, New York, NY (US)

(72) Inventors: Riki Franco, New York, NY (US); Oron Franco, New York, NY (US)

(*) Notice: Subject to any disclaimer, the term of this patent is extended or adjusted under 35 U.S.C. 154(b) by 0 days.

(21) Appl. No.: 17/146,646

(22) Filed: Jan. 12, 2021

(65) Prior Publication Data
US 2021/0214628 A1 Jul. 15, 2021

Related U.S. Application Data

(60) Provisional application No. 62/960,925, filed on Jan. 14, 2020.

(51) Int. Cl.
*C10L 5/08* (2006.01)
*C10L 5/36* (2006.01)
*C10L 5/44* (2006.01)

(52) U.S. Cl.
CPC ............ *C10L 5/08* (2013.01); *C10L 5/361* (2013.01); *C10L 5/442* (2013.01)

(58) Field of Classification Search
CPC ............ C10L 5/08; C10L 5/361; C10L 5/442
See application file for complete search history.

(56) References Cited

U.S. PATENT DOCUMENTS

| 3,268,310 A | 8/1966 | Baggett |
| 3,575,884 A | 4/1971 | Seiler |
| 2011/0262874 A1 | 10/2011 | Kraminer |
| 2013/0219779 A1 | 8/2013 | Komatani |
| 2018/0103798 A1 | 4/2018 | Rosenbaum |
| 2018/0290096 A1 | 10/2018 | House |

FOREIGN PATENT DOCUMENTS

| CN | 100396191 C | 6/2008 | |
| CN | 203700311 U | 7/2014 | |
| EP | 2714863 B1 * | 9/2018 | ............ C10B 49/10 |

(Continued)

OTHER PUBLICATIONS

Ecody, "Production of charcoal made of Pini&Kay briquettes," accessible at: http://ecodgy.com/proisvodstvo.htm, accessed on Aug. 21, 2018.

(Continued)

*Primary Examiner* — Latosha Hines
(74) *Attorney, Agent, or Firm* — David Postolski; Gearhart Law LLC

(57) ABSTRACT

A method to create a natural charcoal briquette is described herein. A wood material is collected and impurities are removed from the wood material. The wood material is dried at a temperature in a range of approximately 150° C. to approximately 200° C. to reach a moisture level in a range of approximately 3.7% to approximately 5.0%. The dried wood material is compressed in a shaped mold at approximately 300° C. and under 40 tons of pressure to form a charcoal briquette. The charcoal briquette is carbonized at a temperature in a range of approximately 700° C. to approximately 800° C. in a range of approximately 14 days to approximately 17 days. The charcoal briquette is then cooled for approximately 2 days prior to use or packaging.

14 Claims, 5 Drawing Sheets

(56) References Cited

FOREIGN PATENT DOCUMENTS

| | | | | | |
|---|---|---|---|---|---|
| JP | 2006306925 | A | * | 11/2006 | |
| KR | 2009029502 | A | * | 3/2009 | |
| KR | 20090029502 | A | * | 3/2009 | |
| KR | 2018085159 | A | * | 7/2018 | ............... B30B 9/02 |
| WO | 2018071112 | A1 | | 4/2018 | |
| WO | 2019146815 | A1 | | 8/2019 | |

OTHER PUBLICATIONS

KMEC Engineering, "ZBJ-LX Briquette Machine," accessible at: http://woodbriquetteplant.com/products/briquette-machine-zbj-lx.html, accessed on: Dec. 30, 2019.

"Sawdust briquettes charcoal," accessible at: http://ckt.com.vn/services/sawdust-charcoal/, accessed on: Jul. 17, 2018.

Grandenergo LLC, "Press extruders (Pini & Kay;) 250-380 kg / h," accessible at: https://grandenegro.by/briket4.html, accessed on: Oct. 25, 2012.

* cited by examiner

SAWDUST CHARCOAL

This is a U.S. Non-Provisional application which claims priority to U.S. Provisional Application No. 62/960,925 filed Jan. 14, 2020. The disclosures of the prior application is hereby incorporated by reference herein in its entirety.

FIELD OF THE EMBODIMENTS

The field of the invention and its embodiments relate to a method for creating a charcoal briquette that is both smokeless and odorless. In particular, the present invention and its embodiments provide a method for creating an all-natural charcoal briquette comprising a wood material and having a fixed carbon content of approximately 90%.

BACKGROUND OF THE EMBODIMENTS

The outdoor barbeque has become a tradition for cooking and social gatherings in North America, and has become especially popular during national holidays, such as Memorial Day and Independence Day. Gas barbeques have increasingly gained popularity due to their ease of use. However, use of gas barbeques renders the grilled food with a lack of the unique smell and flavor of charcoal, and as such, many resort to cooking with charcoal or charcoal briquettes. An added benefit of cooking with charcoal or charcoal briquettes is that it is both simple and convenient.

Charcoal is also widely available in multiple formats, including lump charcoal, charcoal briquettes, and pre-soaked charcoal briquettes. Lump charcoal typically comprises randomly sized chunks of pre-burned hardwood. The popularity of lump charcoal resides in the fact that it is easy to use and ignites quickly. However, lump charcoal has a short life span.

A briquette is a compressed block of coal dust or other combustible biomass material (e.g. charcoal, sawdust, wood chips, peat, or paper) used for fuel and kindling to start a fire. In some examples, briquettes may be brick-shaped and stackable. Charcoal briquettes are typically uniform in size and are an excellent, economical fuel for cooking, as they provide consistent heat, and stay lit for a lengthy period of time. However, due to their dense composition, charcoal briquettes may be extremely difficult to ignite. To resolve this deficiency, lighter fluid or other toxic chemicals may be used to ignite the charcoal briquettes for cooking. In addition, these harsh lighting fluids or chemicals leave a residue on the charcoal briquettes if not completely burned off. This residue not only alters the taste of the food as it is cooked, but deposits a degree of toxicity to the cooked food.

Pre-soaked charcoal briquettes have the same composition as untreated charcoal briquettes, but may also be infused with starter fluid for easy igniting. These fluids create the same toxic problems present with use of the charcoal briquettes.

Thus, a need exists in the field for an inexpensive and 100% natural charcoal briquette free from additives, binders, and/or fuels. In particular, the present invention and its embodiments provide a method for creating a charcoal briquette that is both smokeless and odorless. In particular, the present invention and its embodiments provide a method for creating an all-natural charcoal briquette comprising a wood material and having a fixed carbon content of approximately 90%.

Review of Related Technology:

CN 203700311 U describes a hollow-designed charcoal prepared from crop straws, rice husk, bamboo reeds, and various shrub residual branches.

U.S. Pat. No. 3,575,884 A describes a method to produce active charcoal from sawdust treated with sulfuric acid.

U.S. Pat. No. 3,268,310 A describes charcoal treated with 2-dioxanone to improve the ease of ignition of the charcoal.

U.S. Published Patent Application No. 2018/0103798 A1 describes a fuel disc for use with a barbecue grill made from charcoal that optionally includes hardwood chips.

WO 2018/071112 A1 describes a fuel disc for use with a barbecue grill made from charcoal that optionally includes hardwood chips.

U.S. Published Patent Application No. 2013/0219779 A1 describes a method to convert wood to charcoal.

CN 100396191 C describes a method to prepare natural bamboo charcoal.

U.S. Published Patent Application No. 2011/0262874 A1 describes an odorless and non-toxic alternative to using bagged charcoal briquettes. Specifically, this reference describes natural charcoal briquettes made of compressed charred hardwood and other organic materials.

WO 2019/146815 A1 describes a cube-shaped fire ignition container and, more particularly, to a cube shaped fire container in which the container itself is ignited to ignite charcoal contained therein, thereby generating charcoal fire.

U.S. Published Patent Application No. 2018/0290096 A1 describes a non-extruded filter article, including: an activated carbon honeycomb substrate having a plurality of flow-through channels and porous walls, and the activated carbon substrate comprises a carbon in from 90 to 99.9 wt. % of the article, and the porous walls have a percentage porosity of from 40% to 65%.

Various references describe attempts at remedying the drawbacks associated with charcoal briquettes in the current field. The present invention and its embodiments provide a method for creating a charcoal briquette that is both smokeless and odorless. In particular, the present invention and its embodiments provide a method for creating an all-natural charcoal briquette comprising a wood material and having a fixed carbon content of approximately 90%.

SUMMARY OF THE EMBODIMENTS

The present invention and its embodiments provide a method for creating a charcoal briquette that is both smokeless and odorless. In particular, the present invention and its embodiments provide a method for creating an all-natural charcoal briquette comprising a wood material and having a fixed carbon content of approximately 90%.

A first embodiment of the instant invention describes a method to create a natural charcoal briquette. The method includes first collecting a wood material. The wood material may be sawdust and/or hardwood. The method then includes: removing one or more impurities from the wood material, where each of the one or more impurities include a plastic impurity or a metal impurity. Next, the method includes: drying the wood material at a first temperature in a range of approximately 150° C. to approximately 200° C. to reach a defined moisture level in a range of approximately 3.7% to approximately 5.0%. In some examples, the defined moisture level is approximately 4.95%.

The method then includes: compressing the dried wood material in a shaped mold at a second temperature (approximately 300° C.) and under approximately 40 tons of pressure to form a charcoal briquette. Next, the method includes: carbonizing the charcoal briquette at a third temperature in a range of approximately 700° C. to approximately 800° C. for a first time period in a range of approximately 14 days to approximately 17 days. Then, the method includes: cooling the charcoal briquette for a second time period of approximately 2 days prior to use or packaging.

A second embodiment of the instant invention describes a natural charcoal briquette. The natural charcoal briquette comprises sawdust and has a fixed carbon content of approximately 90%. The natural charcoal briquette has an ash content of approximately 4.85%, a volatile matter content of approximately 4.71%, a gross calorific value of approximately 7553 Kcal/kg, and a total sulfur content of approximately 0.04%. The charcoal briquette has a burn time of at least four hours.

A shape of the natural charcoal briquette may be: a rectangular shape, a hexagonal shape, a diagonal shape, a triangular shape, a quadrilateral shape, a pentagonal shape, a hexagonal shape, a heptagonal shape, an octagonal shape, a nonagonal shape, a decagonal shape, a hendecagonal shape, a dodecagonal shape, a tridecagonal shape, a tetradecagonal shape, a pentadecagonal shape, a hexadecagonal shape, a heptadecagonal shape, an octadecagonal shape, an enneadecagonal shape, or an icosagonal shape. In other examples, a shape of the natural charcoal briquette may be: a circular shape or a substantially circular shape.

A third embodiment of the instant invention describes a hexagonal-shaped charcoal briquette. The charcoal briquette includes a first planar end disposed opposite a second planar end and a cylindrical body located between the first planar end and the second planar end. The cylindrical body has six planar sides, where a planar side of the six planar sides is adjacent another planar side of the six planar sides and meets the other planar side at an edge. The charcoal briquette also includes six cylindrical columns, each of which is disposed along a length of the cylindrical body at the edge.

According to this example, the hexagonal-shaped charcoal briquette comprises a wood material and is smokeless and odorless. The charcoal briquette has a fixed carbon content of approximately 90%. In other examples, the charcoal briquette has a fixed carbon content of approximately 90.44%.

In general, the present invention succeeds in conferring the following benefits and objectives.

It is an object of the present invention to provide an all-natural charcoal briquette.

It is an object of the present invention to provide an all-natural charcoal briquette containing no additives, binders, and/or fuels.

It is an object of the present invention to provide an all-natural charcoal briquette that is smokeless and odorless.

It is an object of the present invention to provide an all-natural charcoal briquette having an increased burn time as compared to traditional charcoal briquettes.

It is an object of the present invention to provide an all-natural and hexagonal-shaped charcoal briquette.

DESCRIPTION OF THE PREFERRED EMBODIMENTS

Figure 1:
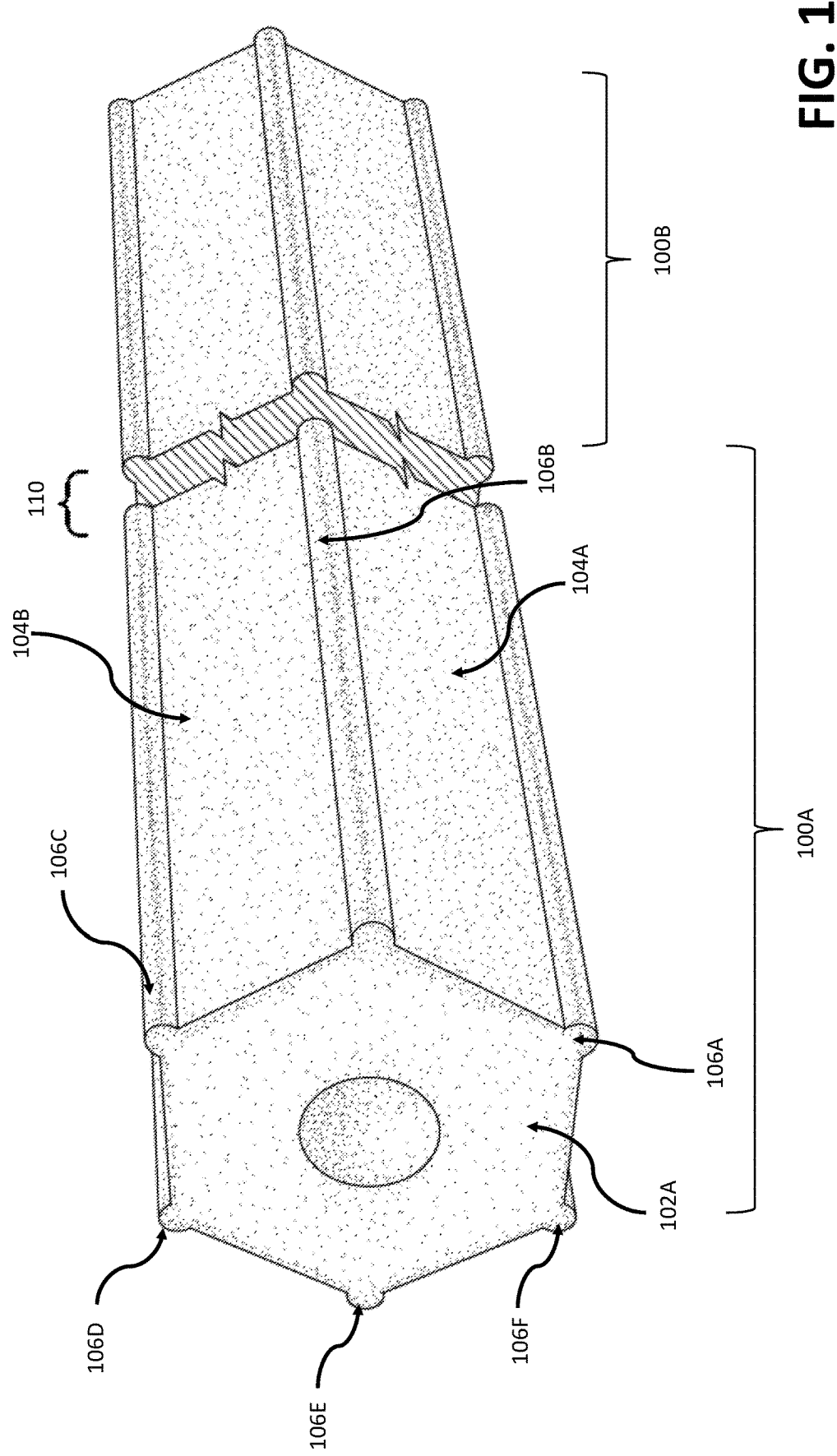
FIG. 1 illustrates a front perspective view of a hexagonal-shaped charcoal briquette, in accordance with embodiments of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As defined herein, a "briquette" is a compressed block of coal dust or other combustible biomass material (e.g. charcoal, sawdust, wood chips, peat, or paper) used for fuel and kindling to start a fire.

Figure 3:
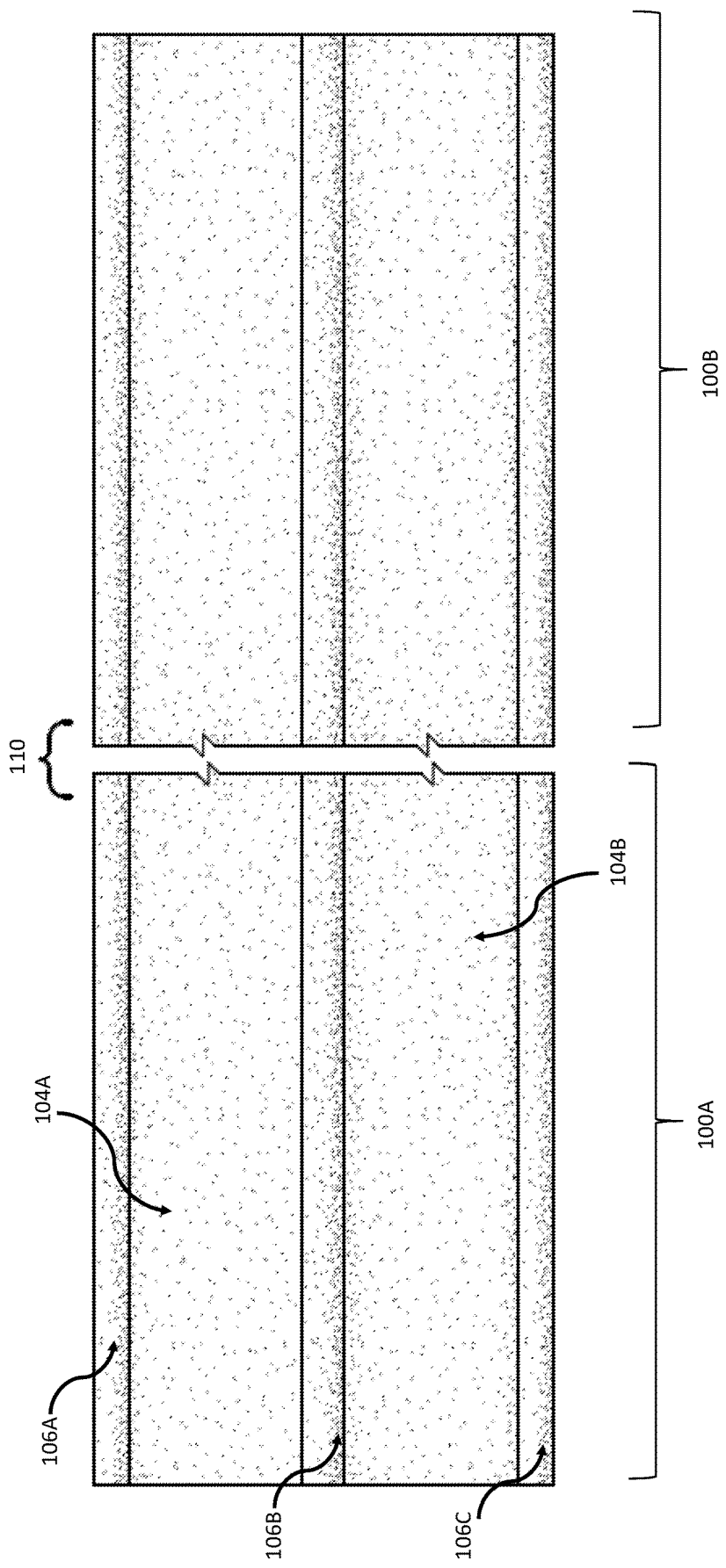
FIG. 3 illustrates a side elevational view of a hexagonal-shaped charcoal briquette, in accordance with embodiments of the present invention.
Figure 4:
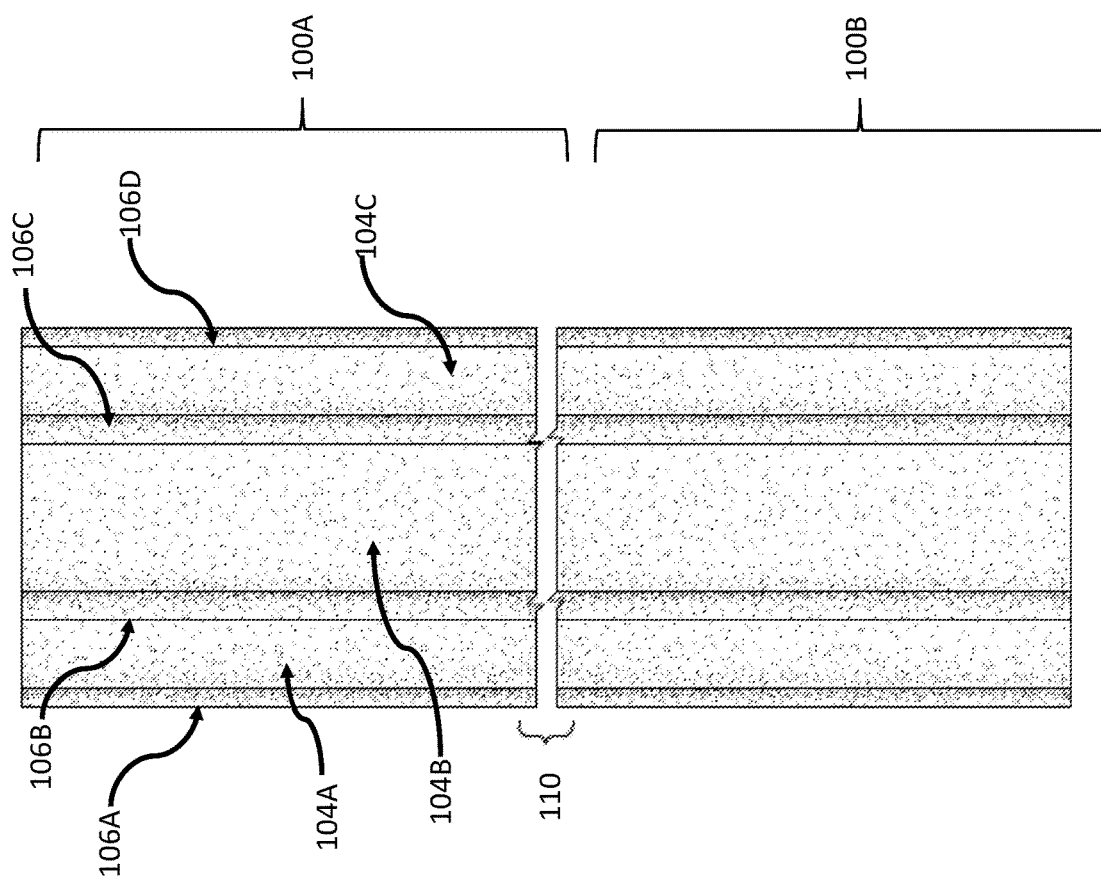
FIG. 4 illustrates a top plan view of a hexagonal-shaped charcoal briquette, in accordance with embodiments of the present invention.

An all-natural charcoal briquette 100A and another all-natural charcoal briquette 100B are depicted in FIG. 1, FIG. 3, and FIG. 4. As depicted in FIG. 1, FIG. 3, and FIG. 4, a gap 110 may be located between the all-natural charcoal briquette 100A and the all-natural charcoal briquette 100B. Moreover, all-natural charcoal briquette 100A may have a protrusion that may be accepted by a recession of the other all-natural charcoal briquette 100B at one or more locations to affix the all-natural charcoal briquette 100A to the other all-natural charcoal briquette 100B or to stack the all-natural charcoal briquette 100A and the other all-natural charcoal briquette 100B.

Figure 2:
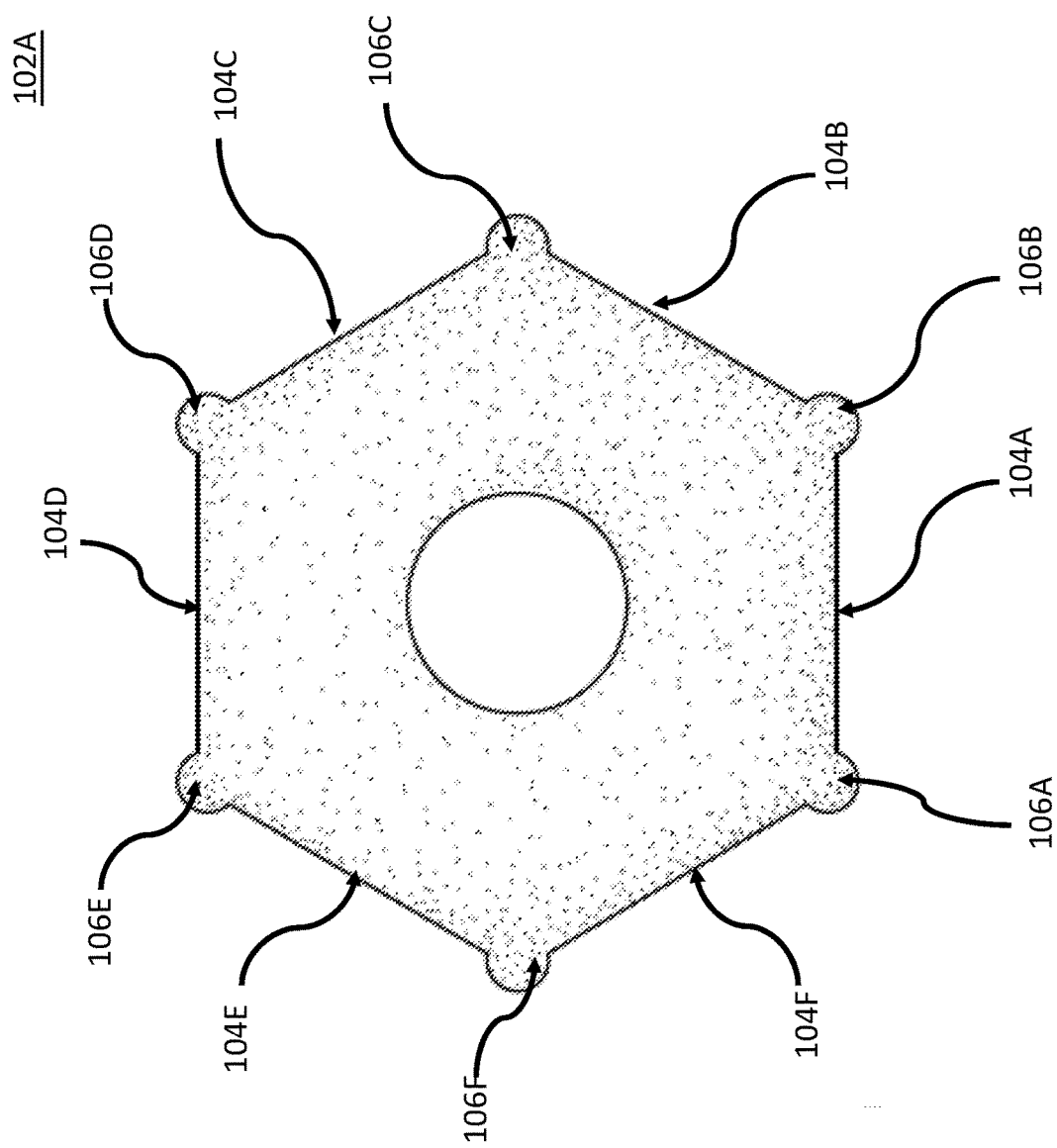
FIG. 2 illustrates a front elevational view of a hexagonal-shaped charcoal briquette, in accordance with embodiments of the present invention.

As depicted in FIG. 1, FIG. 3, and FIG. 4, the all-natural charcoal briquette 100A and the other all-natural charcoal briquette 100B are hexagonal in shape. As depicted in FIG. 1, FIG. 3, and FIG. 4, the all-natural charcoal briquette 100A has a first planar end 102A (as depicted in FIG. 2) disposed opposite a second planar end 102B (not shown). It should be appreciated that the first planar end 102A is identical to the second planar end 102B. Moreover, the all-natural charcoal briquette 100A has a cylindrical body located between the first planar end 102A and the second planar end 102B.

The cylindrical body has six planar sides, which include: a first planar side 104A, a second planar side 104B, a third planar side 104C, a fourth planar side 104D, a fifth planar side 104E, and a sixth planar side 104F (as depicted in FIG. 2). A planar side of the six planar sides (e.g., the first planar side 104A) is adjacent another planar side of the six planar sides (e.g., the second planar side 104B) and meets the other planar side (e.g., the second planar side 104B) at an edge. Moreover, the all-natural charcoal briquette 100A has six cylindrical columns, which include: a first column 106A, a second column 106B, a third column 106C, a fourth column 106D, a fifth column 106E, and a sixth column 106F (as depicted in FIG. 2). Each of the six cylindrical columns is disposed along a length of the cylindrical body at the edge. For example and as depicted in FIG. 2, the first column 106A is located at the edge between the first planar side 104A and the sixth planar side 104F, where the first planar side 104A is located adjacent the sixth planar side 104F. As another example, and as shown in FIG. 2, the second column 106B is located at the edge between the first planar side 104A and the second planar side 104B, where the first planar side 104A is located adjacent the second planar side 104B.

It should be appreciated that, as depicted, the shape of the all-natural charcoal briquette 100A is identical to or substantially similar to the shape of the other all-natural charcoal briquette 100B. However, in other examples, the all-natural charcoal briquette 100A has a first shape and the other all-natural charcoal briquette 100B has a second shape, where the first shape differs from the second shape.

Moreover, it should be appreciated that other shapes of the all-natural charcoal briquette 100A and the other all-natural charcoal briquette 100B are contemplated. For example, the shape of the all-natural charcoal briquette 100A and/or the other all-natural charcoal briquette 100B may be: a rectangular shape, a hexagonal shape, a diagonal shape, a triangular shape, a quadrilateral shape, a pentagonal shape, a heptagonal shape, an octagonal shape, a nonagonal shape, a decagonal shape, a hendecagonal shape, a dodecagonal shape, a tridecagonal shape, a tetradecagonal shape, a pentadecagonal shape, a hexadecagonal shape, a heptadecagonal shape, an octadecagonal shape, an enneadecagonal shape, and/or an icosagonal shape. In other examples, shape of the all-natural charcoal briquette 100A and/or the other all-natural charcoal briquette 100B may be: a circular shape and/or a substantially circular shape. However, the shape of the all-natural charcoal briquette 100A and/or the other all-natural charcoal briquette 100B are not limited to the shapes explicitly described herein and other shapes are contemplated.

Figure 5:
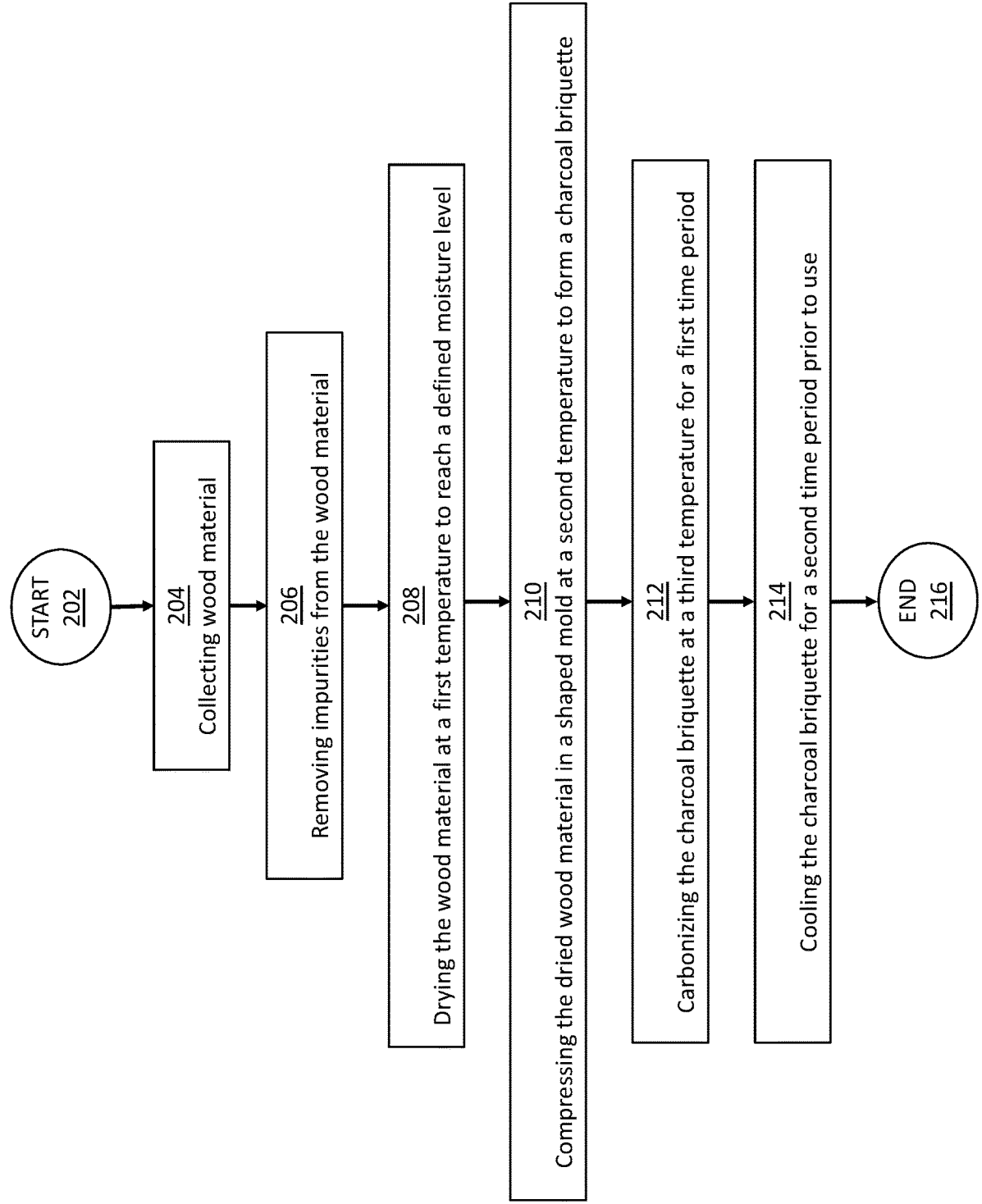
FIG. 5 illustrates a block diagram of a method to create a natural charcoal briquette, in accordance with embodiments of the present invention.

A flowchart for a method 200 to create a natural charcoal briquette (e.g., the all-natural charcoal briquette 100A and/or the other all-natural charcoal briquette 100B as depicted in FIG. 1, FIG. 3, and FIG. 4) is depicted in FIG. 5. The method may start at a process step 202, which is followed by process step 204 that includes collecting a wood material. The wood material may be sawdust and/or hardwood. Traditional charcoal briquettes used for cooking may include numerous components, such as: a fuel (e.g., wood charcoal, lignite coal, anthracite coal, etc.), an ash colorant (e.g., limestone), a binder (e.g., starch), a release agent (e.g., borax), and an accelerant (e.g., sodium nitrate), among other components. In some examples, traditional charcoal briquettes may additionally include sawdust, wax, rice chaff, peanut chaff, sulfuric acid, and/or 2-dioxanone, etc. Thus, differing from traditional charcoal briquettes, the natural charcoal briquette (e.g., the all-natural charcoal briquette 100A and/or the other all-natural charcoal briquette 100B as depicted in FIG. 1, FIG. 3, and FIG. 4) contain no additives, binders, and/or fuels, making the product more eco-friendly and safer for the environment.

The process step 204 may be followed by a process step 206, where one or more impurities may be removed from the wood material. Each of the one or more impurities may be a plastic impurity or a metal impurity. Next, the process step 206 is followed by a process step 208, where the wood material is dried at a first temperature to reach a defined moisture level. According to examples, the first temperature is in a range of approximately 150° C. to approximately 200° C. Moreover, the defined moisture level is in a range of approximately 3.7% to approximately 5.0%. In some examples, the defined moisture level is approximately 4.95%.

Then, the process step 208 is followed by a process step 210, where the dried wood material is compressed in a shaped mold at a second temperature and under approximately 40 tons of pressure to form a charcoal briquette (e.g., the all-natural charcoal briquette 100A and/or the other all-natural charcoal briquette 100B as depicted in FIG. 1, FIG. 3, and FIG. 4). In some examples, the charcoal briquette (e.g., the all-natural charcoal briquette 100A and/or the other all-natural charcoal briquette 100B as depicted in FIG. 1, FIG. 3, and FIG. 4) may be a compressed bar. In other examples, the shaped mold is a hexagonal-shaped mold having a size in a range of approximately 2 centimeters to approximately 4 centimeters in diameter. According to examples, the second temperature is approximately 300° C.

Next, the process step 210 is followed by a process step 212, where the charcoal briquette (e.g., the all-natural charcoal briquette 100A and/or the other all-natural charcoal briquette 100B as depicted in FIG. 1, FIG. 3, and FIG. 4) is carbonized at a third temperature for a first time period. In some examples, the carbonization may occur via a kilning chamber. However, the carbonization is not limited to use of the kilning chamber. According to some examples, the third temperature is in a range of approximately 700° C. to approximately 800° C. Moreover, the first time period is in a range of approximately 14 days to approximately 17 days.

Lastly, the process step 212 is followed by a process step 214, where the charcoal briquette (e.g., the all-natural charcoal briquette 100A and/or the other all-natural charcoal briquette 100B as depicted in FIG. 1, FIG. 3, and FIG. 4) is cooled for a second time period prior to use or packaging. The second time period is approximately 2 days. The process step 214 is followed by a process step 216, which ends the method 200 to create the natural charcoal briquette (e.g., the all-natural charcoal briquette 100A and/or the other all-natural charcoal briquette 100B as depicted in FIG. 1, FIG. 3, and FIG. 4).

At conclusion of the method 200 to create the natural charcoal briquette (e.g., the all-natural charcoal briquette 100A and/or the other all-natural charcoal briquette 100B as depicted in FIG. 1, FIG. 3, and FIG. 4), the all-natural charcoal briquette 100A and the other all-natural charcoal briquette 100B has several properties. The all-natural charcoal briquette 100A and/or the other all-natural charcoal briquette 100B is 100% natural and contains no additives, binders, and/or fuels. Moreover, the all-natural charcoal briquette 100A and/or the other all-natural charcoal briquette 100B is smokeless, odorless, contains no spark, and has a burn time of at least 4 hours. Further, the all-natural charcoal briquette 100A and/or the other all-natural charcoal briquette 100B have a fixed carbon content of approximately 90%. In some examples, the fixed carbon content of the all-natural charcoal briquette 100A and/or the other all-natural charcoal briquette 100B is approximately 90.44%. The all-natural charcoal briquette 100A and/or the other all-natural charcoal briquette 100B has an ash content of approximately 4.85%, a volatile matter content of approximately 4.71%, a gross calorific value of approximately 7553 Kcal/kg, and a total sulfur content of approximately 0.04%. Further, the all-natural charcoal briquette 100A and/or the other all-natural charcoal briquette 100B have an equal density.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method to create a natural charcoal briquette, the method comprising: collecting a wood material, wherein the wood material is selected from the group consisting of: sawdust and hardwood; removing one or more impurities from the wood material; drying the wood material at a first temperature to reach a defined moisture level in a range of approximately 3.0% to approximately 5.0%; compressing the dried wood material in a shaped mold at a second temperature and under approximately 40 tons of pressure to form a compressed wood charcoal briquette; carbonizing the compressed wood charcoal briquette at a third temperature for a first time period in the range of approximately 14 days to approximately 17 days to form a charcoal briquette; and cooling the charcoal briquette for a second time period prior to use or packaging, wherein the charcoal briquette is all-natural, and when burned is smokeless, odorless, and contains no spark.

2. The method of claim 1, wherein each of the one or more impurities are selected from the group consisting of: a plastic impurity and a metal impurity.

3. The method of claim 1, wherein the first temperature is in a range of approximately 150° C. to approximately 200° C.

4. The method of claim 1, wherein the second temperature is approximately 300° C.

5. The method of claim 1, wherein the third temperature is in a range of approximately 700° C. to approximately 800° C.

6. The method of claim 1, wherein the defined moisture level is approximately 4.95%.

7. The method of claim 1, wherein the second time period is approximately 2 days.

8. A natural charcoal briquette comprising sawdust and having a fixed carbon content of approximately 90%, wherein the charcoal briquette has a burn time of at least 4 hours, according to the method of claim 1.

9. The natural charcoal briquette of claim 8, wherein a shape of the charcoal briquette is selected from the group consisting of: a rectangular shape, a hexagonal shape, a diagonal shape, a triangular shape, a quadrilateral shape, a pentagonal shape, a hexagonal shape, a heptagonal shape, an octagonal shape, a nonagonal shape, a decagonal shape, a hendecagonal shape, a dodecagonal shape, a tridecagonal shape, a tetradecagonal shape, a pentadecagonal shape, a hexadecagonal shape, a heptadecagonal shape, an octadecagonal shape, an enneadecagonal shape, and an icosagonal shape.

10. The natural charcoal briquette of claim 8, wherein a shape of the charcoal briquette is selected from the group consisting of: a circular shape and a substantially circular shape.

11. The natural charcoal briquette of claim 8, wherein the natural charcoal briquette has an ash content of approximately 4.85%.

12. The natural charcoal briquette of claim 8, wherein the natural charcoal briquette has a volatile matter content of approximately 4.71%.

13. The natural charcoal briquette of claim 8, wherein the natural charcoal briquette has a gross calorific value of approximately 7553 Kcal/kg.

14. The natural charcoal briquette of claim 8, wherein the natural charcoal briquette has a total sulfur content of approximately 0.04%.

\* \* \* \* \*